Patented Apr. 20, 1937

2,077,469

UNITED STATES PATENT OFFICE 2,077,469

THE PACKING AND TRANSPORTATION OF AMMONIUM NITRATE-AMMONIA COMPOSITIONS

Charles S. Fazel, Syracuse, N. Y., assignor, by mesne assignments, to The Solvay Process Company, New York, N. Y., a corporation of New York No Drawing. Application February 28, 1930, Serial No. 432,254

6 Claims. (Cl. 23—247)

The invention relates to the packing and transportation of nitrogen-containing compositions of matter.

The extent of the fixation of atmospheric nitrogen as ammonia and its use industrially makes it desirable and necessary to handle and transport considerable quantities of ammonia in anhydrous form, and such transportation and handling is attended by many difficulties and added cost, due to the high vapor pressure which, at ordinary temperatures, is about 8 to 9 atmospheres.

Further, the production of ammonium nitrate has required particular care because of its hygroscopicity and explosiveness. The hygroscopic property has made it necessary not only to dry the nitrate thoroughly, but to produce it in the form of grains or small spheres in order to prevent caking as far as possible during transit or storage, inasmuch as this result leads to additional cost and inconvenience in view of the necessity to break up and grind the ammonium nitrate before use.

It is an object of this invention to provide a method for the transportation of ammonia and ammonium nitrate and a transportable package of solutions of ammonium nitrate in ammoniacal liquids.

Other objects of the invention will in part be obvious and will in part appear hereinafter.

The invention accordingly comprises the several steps and relation of one or more of such steps with respect to the others and the article and composition possessing the features, properties and relation of parts which are exemplified in the following detailed disclosure, and the scope of the invention will be indicated in the claims.

In the practice of the invention, a composition may be produced by admixing ammonium nitrate which may be in a dry or substantially dry and crystalline condition and also in the form readily obtained in manufacture, as a composition containing about 75 per cent. ammonium nitrate and about 25 per cent. water, with liquid ammonia, preferably a substantially anhydrous ammonia, in such relative amounts that the vapor pressure of the ammonia is reduced, giving a liquid which has a vapor pressure not substantially in excess of atmospheric pressure at ordinary temperature, such as illustrated in Table 1, hereinafter given, and that the nitrate does not materially "salt out" at ordinary temperatures. The compositions may be readily transported, for example as a package comprising a container, such as a corrosion-resistant cylindrical container, which may be made of one of the group of materials comprising aluminum and chrome-iron, carrying a solution of ammonium nitrate in liquid ammonia, and an admixture thus produced obviates the hygroscopicity of the ammonium nitrate. As stated above and as will be shown by the tables hereinafter given, there is produced a low vapor pressure liquid containing liquid ammonia, or otherwise stated, the vapor pressure of the liquid ammonia is materially reduced. It is, therefore, not necessary to provide pressure vessels for the transportation of the nitrate-liquid ammonia compositions, but instead the compositions may be conveyed, transported or handled in ordinary low-pressure containers and for railroad transportation in tank cars of the ordinary type of construction, if desired.

The composition so produced may accordingly be a concentrated liquid nitrogenous material, anhydrous if preferred, which may contain from 40 to 50% nitrogen.

The relative amounts which have been found to give a satisfactory composition from the standpoint of transportability and utility are about three parts of ammonium nitrate to about one part of substantially anhydrous ammonia. A composition containing ammonium nitrate and anhydrous ammonia in the foregoing proportions has a vapor pressure which is only slightly above atmospheric and in such composition no undesirable hygroscopicity of the ammonium nitrate develops. More particularly such a composition has a vapor pressure at 20° C. of about 19 pounds absolute per square inch, whereas anhydrous ammonia at the same temperature has a vapor pressure of 123 pounds per square inch. If it is considered to be desirable an addition of water may be made to the nitrate-liquid ammonia composition prior to handling or transportation. However, the preferred mode of procedure is to handle and transport the composition formed without any additions.

Reference may here be made to data giving the freezing points and vapor pressures of ammonium nitrate-liquid ammonia compositions containing the constituents in various amounts. These data are given in the following table:

Table I

| Lbs. $NH_4NO_3$ per lb. $NH_3$ | Salting out temperature | Vapor pressures (mm. Hg.—Abs.) | | |
|---|---|---|---|---|
| | | 0° C. | 10° C. | 20° C. |
| 2.25 | −28° C. | 580 | 910 | 1,380 |
| 2.50 | −17 | 500 | 780 | 1,200 |
| 2.75 | −7.2 | 445 | 702 | 1,062 |
| 3.00 | +2.2 | | 628 | 960 |
| 3.25 | +10.0 | | 572 | 875 |
| 3.50 | +20.0 | | | |

It will be noted from the data in the foregoing table that relatively large amounts of ammonium nitrate may be admixed or dissolved in anhydrous ammonia and that when 2.25 to 3.50 pounds of ammonia nitrate per pound of anhydrous ammonia are admixed, solutions are obtained having salting out temperatures varying from −28° C. to +20° C. From this it follows that admixtures within this range of composition will exist in the liquid phase at ordinary temperatures. Further, it will be noted that the vapor pressure of such compositions is less than one atmosphere gage at 20° C., and hence that they may be readily transported without the use of pressure vessels, for example, in tank cars of the type now commonly used for the transportation of ammoniacal liquor.

As indicated above, it may be desirable on occasion to make an addition of water to the ammonium nitrate-liquid ammonia composition, and therefore the following table is presented giving data showing that for the preferred range of composition, namely 2.25 to 3.50 pounds of ammonium nitrate per pound of anhydrous ammonia the freezing or salting out point of the system, ammonium nitrate-ammonia-water is below 15° C. These data are given in Table II:

Table II

| Solubility of $NH_4NO_3$ in $NH_3$-$H_2O$ at 15° C. | | |
|---|---|---|
| Percent $NH_3$ in $NH_3$-$H_2O$ | Lbs. $NH_4NO_3$/ lb. $NH_3$-$H_2O$ | Equivalent in lbs. $NH_4NO_3$ per lb. $NH_3$ |
| Percent | | |
| 20 | 1.6 | 8.0 |
| 30 | 1.7 | 5.6 |
| 40 | 1.9 | 4.8 |
| 50 | 2.2 | 4.4 |
| 60 | 2.4 | 4.0 |

As illustrative embodiments of a manner in which the present invention may be practiced, the following examples are presented: The parts are by weight.

*Example 1.*—An admixture is formed by adding 300 parts of substantially dry crystalline ammonium nitrate to 100 parts of anhydrous ammonia, and securing complete solution of the ammonium nitrate in the anhydrous ammonia. This composition has a vapor pressure at 20° C. of about 960 millimeters of mercury or only slightly higher than atmospheric pressure and about one-sixth of the vapor pressure of anhydrous ammonia at that temperature. Also the composition contains the ingredients in such proportions that at temperatures above about 2° C. no salting out of the ammonium nitrate will occur. The composition so produced may be transported by placing the same in a suitable container such as a chrome-iron or aluminum cylinder or inasmuch as the vapor pressure is about atmospheric pressure, it may be transported in a tank car of the type of construction such as is commonly used for the transportation of ammoniacal liquor. If conditions such as a temperature below 0° C. and a relatively high concentration of ammonium nitrate should occasion a salting out or deposition of crystalline ammonium nitrate, the composition may again be made homogeneous by heating, for instance, provision may be made for such conditions by equipping the container, for example a tank car, with heating coils.

*Example 2.*—In the event that it may be desired to transport a composition containing ammonium nitrate-ammonia and water, there first may be prepared an admixture of ammonium nitrate and anhydrous ammonia, as in Example 1, and then add to this admixture about twenty-five parts of water for each one hundred parts of ammonium nitrate-liquid ammonia composition. The foregoing procedure gives a product substantially equivalent to a 50 per cent. aqua ammonia to which has been added three pounds of ammonium nitrate per pound of contained ammonia and having a vapor pressure such that it may be readily transported without the use of pressure vessels, i. e. in low pressure vessels.

It will be realized of course in this connection that a larger or smaller amount of water may be added to the ammonium nitrate-liquid ammonia composition, depending upon the attending circumstances and the use which is to be made of the composition. It is to be understood that liquid ammonia includes ammonia-containing compositions in which water is present, but in such an amount that the solution has a vapor pressure at ordinary temperatures, substantially greater than atmospheric.

The invention reduces the cost attending the packaging and transportation of fixed nitrogen, the expense and difficulties attending the shipment of ammonium nitrate and permits shipment of anhydrous ammonia in low pressure containers due to a reduction in the vapor pressure thereof.

While the invention has been described above with particular reference to ammonium nitrate, it will be understood that it is likewise applicable to compounds, particularly inorganic salts which act in a similar manner.

Since certain changes in carrying out the above process and certain modifications in the article and in the composition which embodies the invention may be made without departing from the scope, it is intended that all matter contained in the above description shall be interpreted as illustrative and not in a limiting sense.

I claim:

1. A package comprising a vessel the interior surface of which consists of one of a group of corrosion-resistant materials consisting of chrome-iron and aluminum, said vessel containing a liquid comprising ammonium nitrate and ammonia.

2. In the storage and transportation of an ammoniacal solution of ammonium nitrate the improvement which comprises forming a metallic vessel with an interior surface consisting of one of the group of corrosion-resistant materials consisting of chrome-iron and aluminum and introducing the ammoniacal solution of ammonium nitrate therein.

3. In the storage and transportation of an ammoniacal solution of ammonium nitrate the improvement which comprises forming a metallic vessel with an interior surface consisting of chrome-iron and introducing the ammoniacal solution of ammonium nitrate therein.

4. A package comprising a vessel the interior surface of which consists of aluminum, said vessel containing an ammoniacal solution of ammonium nitrate.

5. In the storage and transportation of an ammoniacal solution of ammonium nitrate the improvement which comprises forming a metallic vessel with an interior surface consisting of aluminum and introducing the ammoniacal solution of ammonium nitrate therein.

6. A package comprising a vessel the interior surface of which consists of chrome-iron, said vessel containing an ammoniacal solution of ammonium nitrate.

CHARLES S. FAZEL.